US006575331B1

(12) United States Patent
Peeler et al.

(10) Patent No.: US 6,575,331 B1
(45) Date of Patent: Jun. 10, 2003

(54) HYDRAULICALLY AND VOLUMETRICALLY DISPENSING AND FILLING FLUID

(75) Inventors: Scott C. Peeler, Sandy, UT (US); Brian W. Guest, Farmington, UT (US)

(73) Assignee: Zaxis, Inc., Salt Lake City, UT (US)

( * ) Notice: Subject to any disclaimer, the term of this patent is extended or adjusted under 35 U.S.C. 154(b) by 0 days.

(21) Appl. No.: 10/096,706

(22) Filed: Mar. 12, 2002

Related U.S. Application Data

(63) Continuation-in-part of application No. 10/016,970, filed on Dec. 14, 2001.

(51) Int. Cl.$^7$ .................................................. G01F 11/00
(52) U.S. Cl. ............................. 222/1; 222/61; 222/63; 222/334; 222/389
(58) Field of Search ................................ 222/1, 61, 63, 222/137, 145.3, 145.5, 145.6, 334, 386, 389, 390

(56) References Cited

U.S. PATENT DOCUMENTS

| 3,800,984 A | * | 4/1974 | Phelan .......................... 422/100 |
| 3,921,858 A | | 11/1975 | Bemm .......................... 222/146 |
| 4,231,494 A | | 11/1980 | Greenwood ................... 222/325 |
| 4,365,728 A | | 12/1982 | Tokorozawa et al. ........ 222/209 |
| 4,494,676 A | * | 1/1985 | Berweger ....................... 222/63 |
| 4,955,514 A | | 9/1990 | Dickau .......................... 222/518 |
| 4,964,533 A | | 10/1990 | Allington et al. ............... 222/14 |
| 5,219,099 A | | 6/1993 | Spence et al. ................ 222/325 |
| 5,226,575 A | | 7/1993 | Faust ........................ 222/611.2 |
| 5,584,814 A | | 12/1996 | Schuster et al. .............. 604/187 |
| 5,630,527 A | | 5/1997 | Beebe et al. ..................... 222/1 |
| 5,816,450 A | | 10/1998 | Alexander et al. ........... 222/179 |
| 5,823,406 A | * | 10/1998 | Roberts ........................ 222/626 |
| 5,878,921 A | | 3/1999 | Chase et al. ................. 222/333 |
| 5,964,381 A | | 10/1999 | El-Hage et al. .............. 222/386 |
| 6,041,977 A | | 3/2000 | Lisi .............................. 222/389 |
| 6,050,450 A | | 4/2000 | Gardos ........................... 222/1 |
| 6,193,111 B1 | | 2/2001 | Adams ........................ 222/148 |
| 6,268,000 B1 | | 7/2001 | Romer ........................ 426/115 |

* cited by examiner

Primary Examiner—Joseph A. Kaufman
(74) Attorney, Agent, or Firm—Todd E. Zenger; Kirton & McConkie

(57) ABSTRACT

Systems and methods for hydraulically and volumetrically filling and dispensing target fluid. A hydraulic system comprises an actuator, a hydraulic coupler that includes substantially incompressible hydraulic liquid, and a target fluid container. The actuator includes a motor or driver, such as a step motor, linear actuator, servomotor, pneumatic motor, or other similar device, to selectively drive a piston of the hydraulic coupler. The coupler includes a conduit, column, shaft or other leak proof assembly that acts as a conduit for the substantially incompressible hydraulic liquid and includes a cord and a piston, which is selectively pushed by the incompressible hydraulic liquid, thereby driving a plunger to selectively press against a slidable wall of the target fluid container, causing the target fluid to be dispensed therefrom, or retract the plunger from the container, pulling the slidable wall therewith through the use of a vacuum selectively created between the plunger and the wall. Furthermore, the system may include a controller that is configured to control the target fluid dispensed and to receive input from a user.

20 Claims, 8 Drawing Sheets

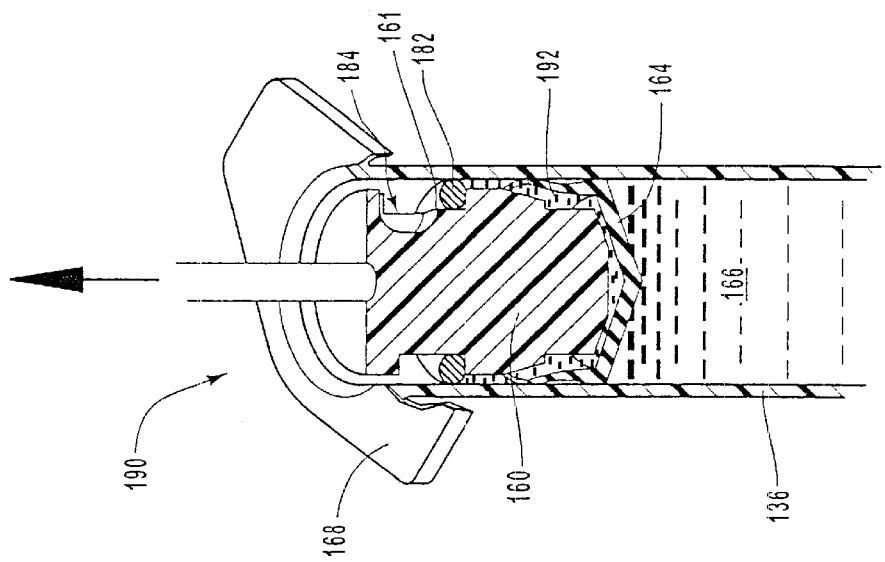
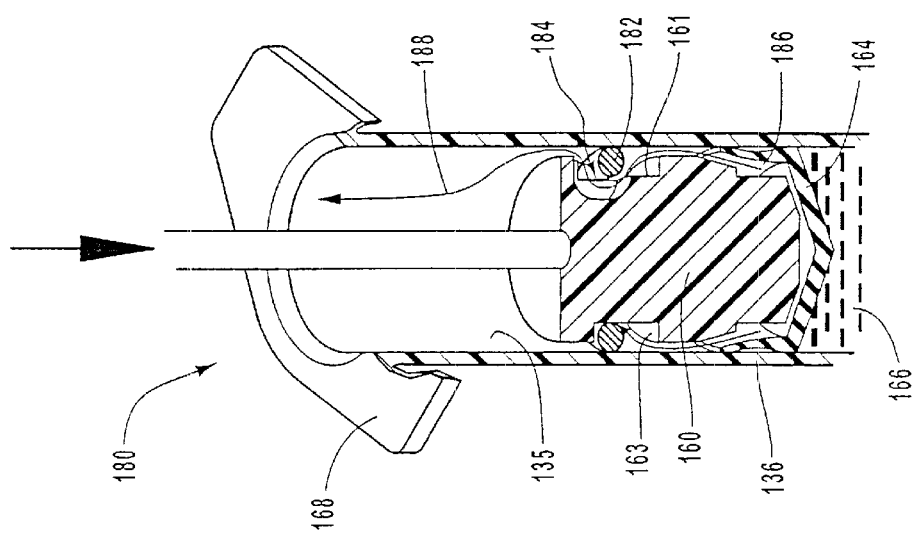

HYDRAULICALLY AND VOLUMETRICALLY DISPENSING AND FILLING FLUID

RELATED APPLICATION

This application is a continuation-in-part of United States patent application Ser. No. 10/016,970, filed on Dec. 14, 2001 and titled HYDRAULICALLY AND VOLUMETRICALLY DISPENSING A TARGET FLUID.

BACKGROUND OF THE INVENTION

1. Field of the Invention

The present invention relates to hydraulically and volumetrically dispensing and or filling fluid. More particularly, the present invention relates to systems and methods for dispensing and/or filling a known volume of a target fluid, whether liquid and/or gas, through the use of a hydraulic system.

2. Background and Related Art

Historically, a variety of techniques have been employed to dispense materials. Such techniques have included pushing a material through a flexible conduit, using a water control valve to provide pressure to a material, employing a water control valve to dispense the material, and using a hand-held applicator that accommodates a syringe, each of which will be discussed below.

A first technique employs a flexible conduit through which a material is pushed. In U.S. Pat. No. 5,878,921, a grout delivery apparatus and method is disclosed for delivering grout through a flexible conduit from a bulk supply of grout to a hand tool. The bulk supply of grout is held in a hopper, which feeds the grout under gravity to a pump. The pump is driven by an electric motor, which receives its electrical energy through a controller. The controller is adjustably preset to control the electric motor as a function of the individual settings on a malfunction switch operable by the worker. The switch can either be mounted on the hand tool and directly wired to the controller or incorporated into a remote transmitter, which transmits the particular switch position to a receiver on the controller. Similarly, U.S. Pat. No. 6,268,000 discloses a device for dispensing pastry dough, frosting, or icing from a cartridge. The device has a cartridge container and a hand-held gun. An electric motor having a piston is coupled to the cartridge container. The piston acts on a plunger of the cartridge to apply pressure on the pastry dough, frosting, or icing to permit the pastry dough, frosting, or icing to move to the gun to be dispensed. The technique in both disclosures requires a material to be pushed through a tube or flexible conduit in order to dispense or apply the material. One disadvantage of this technique is that residue of the material is typically left behind on the inside wall of the tube or conduit that must be cleaned. This requirement of cleaning the tube or conduit can be time consuming and the residue indicates a waste of a portion of the material.

In a second technique, a water control valve is employed to provide direct pressure to a material that is being dispensed. This technique is disclosed in U.S. Pat. No. 6,041,977, which discloses a dispensing system for dispensing decorating materials, such as frosting. The dispensing system includes a dispensing tube having the material to be dispensed and a water-operated piston. Application of water under pressure to the dispensing tube results in the dispensing of the material through a decorating tip. The water pressure applied to the dispensing tube is controlled and regulated through the utilization of a control valve assembly having a flow stop valve and an on/off valve. Water applied to the control valve assembly is pressure regulated and filtered. While this technique reduces the requirement for cleaning and reduces the amount of material wasted, it requires the constant pressurizing of water and typically proves to be awkward in use of some applications.

A third technique employs compressed air to dispense a material. This technique illustrated in U.S. Pat. No. 5,964,381, in which a piston is disposed inside a tube having an inner cross-sectional size and shape uniform along its length. The tube has an open end. The piston is free to move literally inside the tube and preferably may move out of the tube through the open end. If the tube is cylindrical in shape it has a constant inner diameter. The open end of the tube is neither tapered nor flaring. Liquid samples are aspirated into the device by pulling the piston back. The sample is then ejected by accelerating the piston to a minimum velocity to force the liquid sample out of the open end of the tube. The velocity of the sample is sufficient to render negligible effects of surface tension forces. The volume of the liquid sample dispensed is determined by the inner diameter of the tube and the piston displacement. Accurate positioning of the piston provides samples of accurate volumes. This technique can provide an accurate delivery of a material as long as the viscosity of the air does not change. However, a change in atmospheric temperature and/or pressure affects the technique by requiring the system to be adjusted for each given atmospheric modification. As such, this technique can prove to be time consuming, as it requires the calibration to the various surrounding conditions.

Another technique is provided in U.S. Pat. No. 5,630,527, which discloses a fluid dispenser system, and method of use thereof, primarily in industrial applications requiring the dispensing of fluids, such as epoxies, silicones, adhesives, etc., allowing for very precise control of the volume of fluid extruded. The system comprises an ergonomic, hand-held applicator accommodating a conventional medical syringe, wherein the applicator is attached to an electronic control unit by a power cord. The applicator is provided with a stepping motor that drives a piston or screw a specific distance in response to an electronic signal generated by the control unit. Displacement of the piston or screw creates a positive pressure on a fluid contained in the syringe, thereby causing fluid extrusion from the syringe. While this technique can dispense a precise amount of material, the apparatus of the hand-held applicator can prove to be bulky and awkward to use.

Thus, while techniques currently exist that are used to apply or dispense a material, challenges still exist, including causing a portion of the material to be wasted, needing to clean the residue from the material after each use, requiring a calibration of the device for each surrounding condition, and other such challenges. Accordingly, it would be an improvement in the art to augment or even replace current techniques with other techniques.

SUMMARY OF THE INVENTION

The present invention relates to hydraulically and volumetrically dispensing and/or filling fluid. More particularly, the present invention relates to systems and methods for dispensing and/or filling a known volume of target fluid through the use of a hydraulic system. As used herein, "known volume" means a metered controlled predeterminable quantity of fluid or in some embodiments a predetermined quantity of fluid which has a controlled volume or quantity such as a bolus.

Implementation of the present invention takes place in association with a target fluid, whether in a liquid and/or gaseous state, that is selectively filled or dispensed. A hydraulic system is configured to selectively provide mechanical pressure in order to dispense a volumetric or metered dose of the target fluid from a container, syringe, etc., which includes a slidable or movable plunger or wall that when moved forces the target fluid out of the container or syringe or draws substances into the container or syringe.

In one implementation, a dispensing system includes an actuator, such as a motor or driver, a hydraulic coupler, column or tube that includes substantially incompressible hydraulic liquid, and a mechanical interface to the container or syringe. The actuator may comprise a motor or driver, such as a step motor, linear actuator, servomotor, pneumatic motor, or other similar device, to drive a plunger or piston of the hydraulic coupler. The coupler includes a conduit, column, shaft or other leakproof assembly that acts as a conduit for the substantially incompressible hydraulic liquid. The conduit is connected at one end to a plunger/piston and at the other end to a mechanical interface. The mechanical interface includes a cylinder structure with another plunger or piston that is selectively pushed by the incompressible hydraulic liquid, thereby driving a head of the plunger or piston to press against the wall or plunger of the container or syringe that contains the target fluid, causing the target fluid to be dispensed therefrom. Thus, an actuator selectively provides a force on the hydraulic coupler, which transfers the force to the target fluid to dispense the target fluid from the container. In one implementation, a controller or computer device is coupled to the actuator to accurately dispense a volumetric amount of the target fluid.

In one implementation, a cord is used as part of a mechanical back-link. For example, the cord extends through the hydraulic liquid with the ends thereof coupled to opposing pistons. Thus, a force exerted by one of the pistons, such as a master piston/cylinder, causes the cord to be used on the corresponding slave piston to withdraw or retract a corresponding plunger from the target fluid container. In a further implementation, a vacuum is selectively and automatically obtained as the plunger retracts from the container.

While the methods and processes of the present invention have proven to be particularly useful in the area of dispensing a precise amount of target fluid, those skilled in the art can appreciate that the methods and processes can be used in a variety of different applications and in a variety of different areas of manufacture and/or industry to accurately dispensing a volumetric amount of fluid.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIG. 8A illustrates a cross-sectional view of a representative system that selectively allows for the passage of air as a plunger extends down a target fluid container; and FIG. 8B illustrates a cross-sectional view of the system of FIG. 8A that selectively creates a vacuum as the plunger retracts from the target fluid container.

DETAILED DESCRIPTION OF THE INVENTION

The present invention relates to hydraulically and volumetrically dispensing and/or filling a target fluid. More particularly, the present invention relates to systems and methods for dispensing and/or filling a known volume of target fluid through the use of a hydraulic system.

In the disclosure and in the claims the term "target fluid" shall refer to any material that may be filled and/or dispensed, whether in a liquid and/or gaseous state. Examples of target fluid include medication, water, oil, grease, paint, adhesive, solvent, lotion, food products (e.g., baby food, condiments, juice, etc.), lubrication, u-v cure adhesives, anaerobics, cyanoacrylates, epoxy, silicone, sealant, oxygen, hydrogen, nitrogen, air, and any other liquid and/or gas that have a rheology compatible with being dispensed by physical force. Furthermore, the term "target fluid" shall include materials that are not in a liquid and/or gaseous state, but which may still be dispensed, such as a powder (e.g., graphite), or a paste (e.g., solder paste).

The following disclosure of the present invention is grouped into three subheadings, namely "Hydraulically Dispensing Target Fluid," "Utilizing a Computer Device," and "Providing a Mechanical Back-Link." The utilization of the subheadings is for convenience of the reader only and is not to be construed as limiting in any sense.

Hydraulically Dispensing Target Fluid

Figure 1:
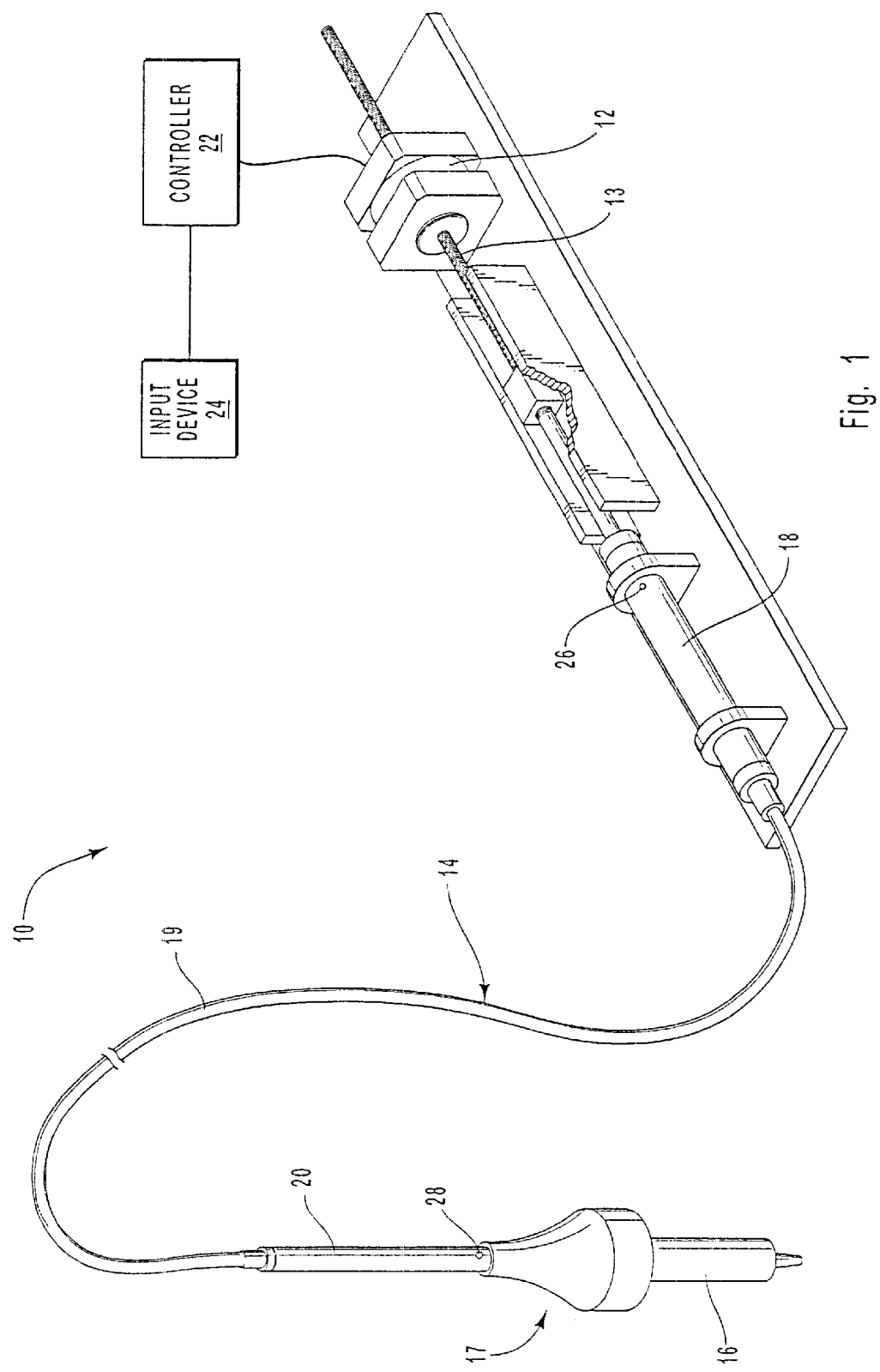
FIG. 1 illustrates a representative system that provides a suitable operating environment to dispense or fill a volumetric amount of target fluid in accordance with the present invention.

Embodiments of the present invention take place in association with a target fluid that is to be selectively filled and/or dispensed. FIG. 1 and the corresponding discussion are intended to provide a general description of a representative embodiment or suitable operating environment in which the invention may be implemented. One skilled in the art will appreciate that the invention may be practiced by one or more systems, and in a variety of system configurations, to enable target fluid to be hydraulically and volumetrically filled and/or dispensed in accordance with the present invention.

In FIG. 1, a representative system is illustrated as dispensing system 10 that may be used to selectively fill and/or dispense target fluid. System 10 includes an actuator 12, a hydraulic coupler 14, and a container of target fluid 16 to be dispensed. Actuator 12 is a driving mechanism, which is an example of actuator means. Particular examples of a driving mechanism include a step motor, a linear actuator, a servomotor, pneumatic motor, a variable frequency drive, or other similar motor or device that may be configured to initiate or create a force at a controlled or selected rate or step.

Actuator 12 creates a linear force on screw 13 that is transferred to hydraulic coupler 14. Coupler 14 is an example of hydraulic means. By way of example, hydraulic coupler 14 comprises a master cylinder 18, a conduit 19, a slave cylinder 20, and optionally a connector 17 for selectively coupling to container 16. Those skilled in the art will appreciate that while cylinders are illustrated in the present embodiment, a variety of different shapes and/or sizes may be used as part of a hydraulic coupler to provide a master-slave relationship.

While FIG. 1 illustrates the use of a block or component that connects screw 13 to a shaft of master cylinder 18, embodiments of the present invention embrace a direct coupling of a cylinder shaft to an actuator. For example, the cylinder shaft is a proximal portion of a piston that may be displaced within a cylinder, wherein the proximal end of the shaft is threaded to directly couple to an actuator.

Figure 2:
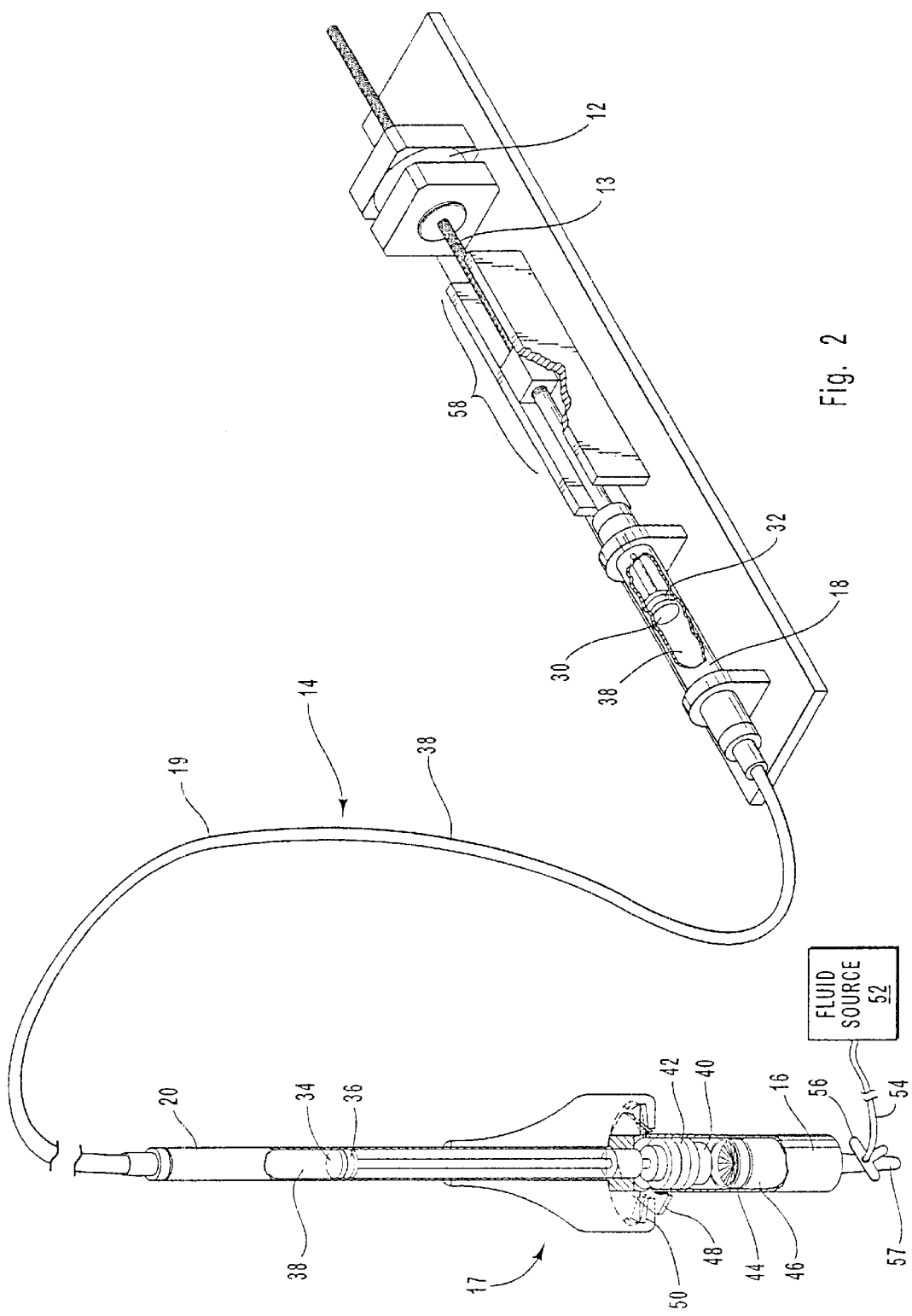
FIG. 2 illustrates a cross-sectional view of various components of the representative system of FIG. 1.

With reference to FIG. 2, hydraulic coupler 14 is configured to contain a substantially incompressible hydraulic liquid 38, such as silicone, water, silicone oil, alcohol, brake fluid, food grade hydraulic liquid, or another hydraulic liquid that has properties preventing expansion or contraction over a broad enough temperature range. Hydraulic liquid 38 extends from a first hydraulic piston head 30, at least a portion of which is contained within master cylinder 18, through conduit 19, and to a second hydraulic piston head 34, at least a portion of which is contained within slave cylinder 20. This allows a force by piston head 30 to transfer to piston head 34, causing the master-slave relationship. Similarly, a force from piston head 34 may be transferred to piston head 30. In order to prevent leakage of hydraulic liquid 38, one or more seals may be placed at or near the respective heads of piston heads 30 and 34. In FIG. 2, the seals are respectively illustrated as O-rings 32 and 36. While an O-ring is illustrated in the present embodiment, those skilled in the art will appreciate that other seals may be used, such as one or more quad seals, or one or more flaps.

In the illustrated embodiment, actuator 12 initiates a force that displaces piston 30. The displacement of a piston, such as piston 30, is an example of actuating the hydraulic means. A force that displaces a piston may be hydraulically transferred to one or more other pistons to selectively dispense a target fluid or fill a container with target fluid.

While the embodiment illustrated in FIG. 2 illustrates a hydraulic coupler/system that comprises two pistons/plungers, embodiments of the present invention embrace hydraulic couplers/systems that comprise more than two pistons/plungers. One such embodiment includes a Y-shaped hydraulic coupler that comprises three pistons/plungers, wherein one is used as a master and the other two are used as slaves.

With reference back to FIG. 1, one or more vents, illustrated as apertures 26 and 28, permit the user to selectively allow for gas, such as atmospheric air, to enter and exit cylinders 18 and 20, thereby allowing piston heads 30 and 34 (FIG. 2) to be displaced as desired. Apertures 26 and 28 may also be used to purge undesirable gases.

In FIG. 1, container 16 is configured to contain a target fluid therein and is coupled to hydraulic coupler 14 at connector 17. Container 16 is an example of dispensing means. Furthermore, the term "dispensing means" includes a plurality of dispensing means per hydraulic means. With reference to FIG. 2, a cross-sectional view of system slave cylinder 20, connector 17 and container 16 is provided. In the illustrated embodiment, container 16 is configured to contain a reservoir of target fluid 46 that may be selectively and accurately dispensed from container 16 in accordance with the present invention. In one embodiment, container 16 includes a slidable or movable wall or cap (illustrated as cap 44) to contain and dispense target fluid 46. Other embodiments embrace the use of a slidable or movable plunger to contain and dispense the target fluid.

Container 16 may be removably or fixably coupled to hydraulic coupler 14. In the illustrated embodiment, container 16 includes a surface 48 that may be selectively and rotatably coupled to receiver 50 of connector 17. When coupled, a distal end 40 of piston head 34 extends down at least a portion of container 16. In the illustrated embodiment, a seal 42 is coupled to distal end 40 to prevent target fluid 46 from escaping. Thus, as a force is transferred to piston head 34, distal end 40 moves toward distal end 57 of container 16 to cause an amount of the target fluid 46 to be dispensed therefrom. In a further embodiment, container 16 comprises a polymer and/or is disposible.

In one embodiment, an additional optional feature is disclosed. As illustrated in FIG. 2, container 16 may be coupled to a target fluid source 52 through the use of a target fluid source connector 54. Thus, the withdrawal of piston head 30 or otherwise movement of piston head 34 toward piston head 30 enables target fluid from target fluid source 52 to enter container 16. Furthermore, a valve 56 may be used to selectively fill container 16 with target fluid 46 from target fluid source 52 or dispense target fluid 46 from container 16 through distal end 57.

As provided above, embodiments of the present invention embrace the use of a hydraulic system that is configured to selectively provide controlled mechanical pressure in order to dispense a volumetric or metered dose of the target fluid from a container, syringe, or other target fluid source. The driving mechanism actuates a force on the hydraulic coupler/system, which transfers the force to the target fluid in order to selectively dispense an amount of target fluid. Moreover, as will be further discussed herein, a driving mechanism may actuate a force on the hydraulic coupler/system to fill at least a portion of a container with target fluid.

As illustrated in the embodiment of FIG. 1, another feature is disclosed. A controller 22 may be coupled to actuator 12 to cause actuator 12 to create a precise force on hydraulic coupler 14. As will be discussed below, one example of a controller is a computer device that may be selectively programmed to control actuator 12. Embodiments of the present invention embrace the use of feedback, such as feedback sent from actuator 12 to controller 22. An input device 24 may be coupled to controller 22 to enable user input. The control of the force created by the driving mechanism (actuator 12) and transferred to hydraulic coupler enables for a precise volumetric or metered dose or amount of target fluid to be dispensed.

Figure 3:
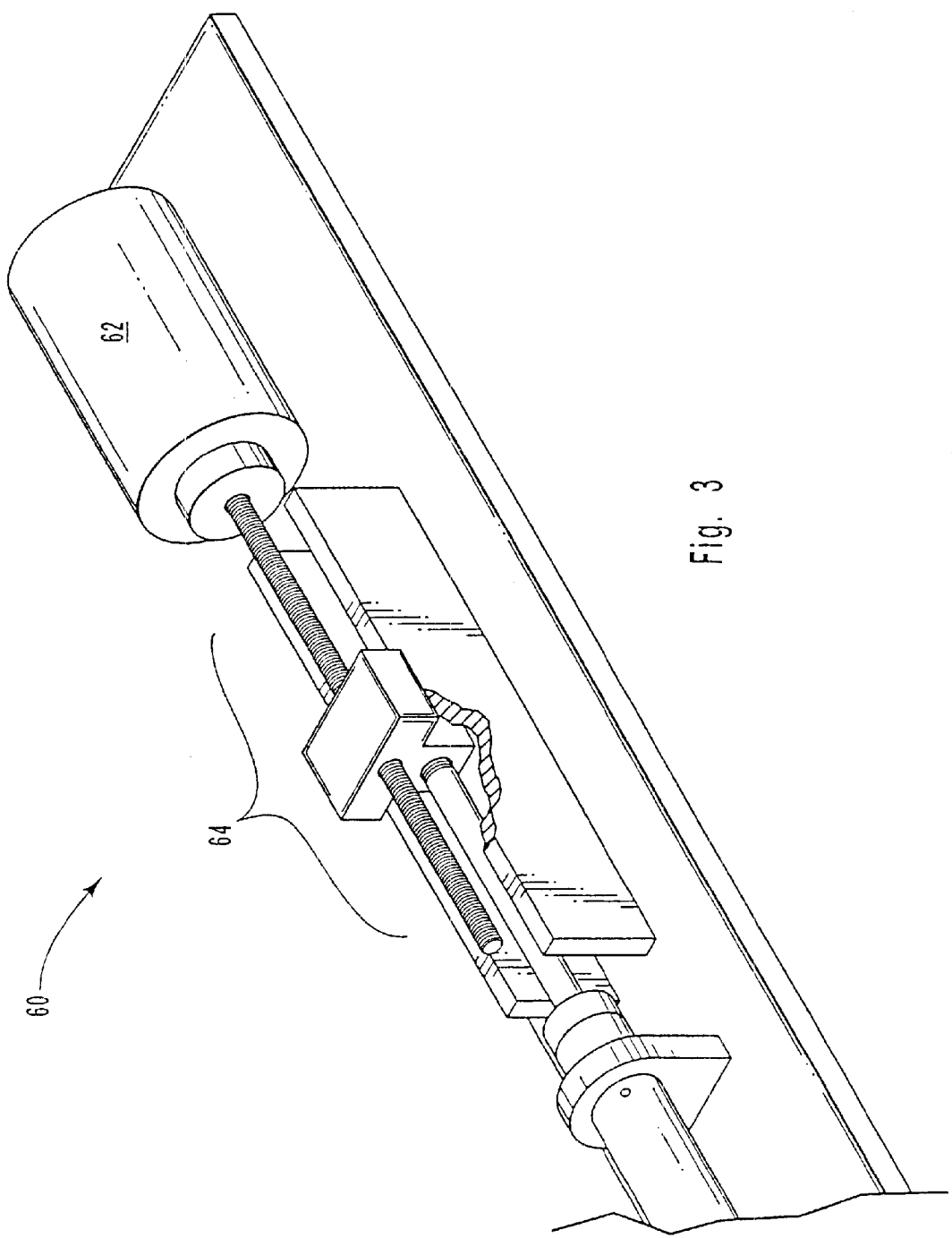
FIG. 3 illustrates an alternative actuator that may be used in association with the present invention.
Figure 4:
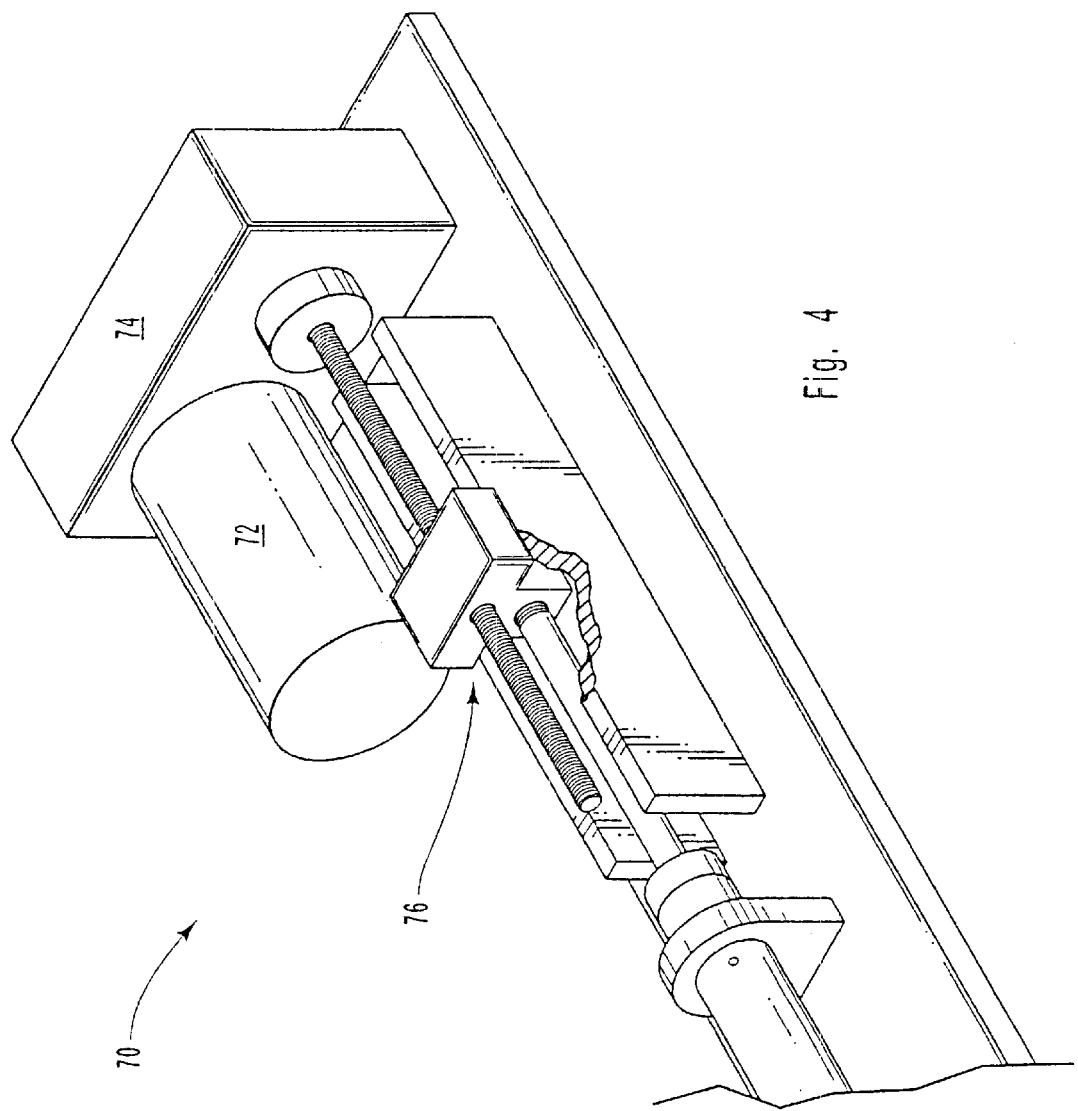
FIG. 4 illustrates another alternative an actuator that may be used in association with the present invention.

Those skilled in the art will appreciate that a variety of different types and sizes of driving mechanisms and configurations thereof may be used in accordance with the present invention to selectively dispense target fluid. For example, with reference to FIGS. 3 and 4 two alternative embodiments of driving mechanisms are provided. In FIG. 3, a representative driving mechanism 60 is illustrated that includes motor 62, which is an example of an actuator, and driving components 64 that provide a force onto a hydraulic coupler/system. Similarly, in FIG. 4 a representative driving mechanism 70 is illustrated that includes motor 72, gear box 74 and driving components 76. Thus, driving mechanisms used in accordance with the present invention may be a direct-drive mechanism, may include one or more belts and/or gears, and/or may utilize some type of transmission or gear change. Furthermore, the drive mechanisms may be in-line or indirect. Moreover, any driving mechanism is contemplated so long as it permits the user to selectively choose the amount of force created, i.e., displacement of driving component which acts upon hydraulic coupler 14.

Those skilled in the art will appreciate that embodiments of the present invention embrace a variety of different system configurations. For example, in one embodiment a dispensing system is configured in accordance with the present invention to manually dispense target fluid. In another embodiment, a dispensing system is configured to automatically dispense a volumetric amount of target fluid. For example, a distal portion of system 10 (FIG. 1) including connector 17 and container 16 may be coupled to an X-Y or an X-Y-Z mechanical system or mechanism that receives input from a controller, such as controller 22 or another controller or computer device, to precisely locate container 16 and dispense a precise volumetric amount of the target fluid within container 16 at the desired location. In a further embodiment, a system may include a plurality of containers to selectively and accurately dispense, for example, a multiple-part target fluid or multiple volumetric amounts of the target fluid simultaneously or in a series of dispensing events.

Figure 5:
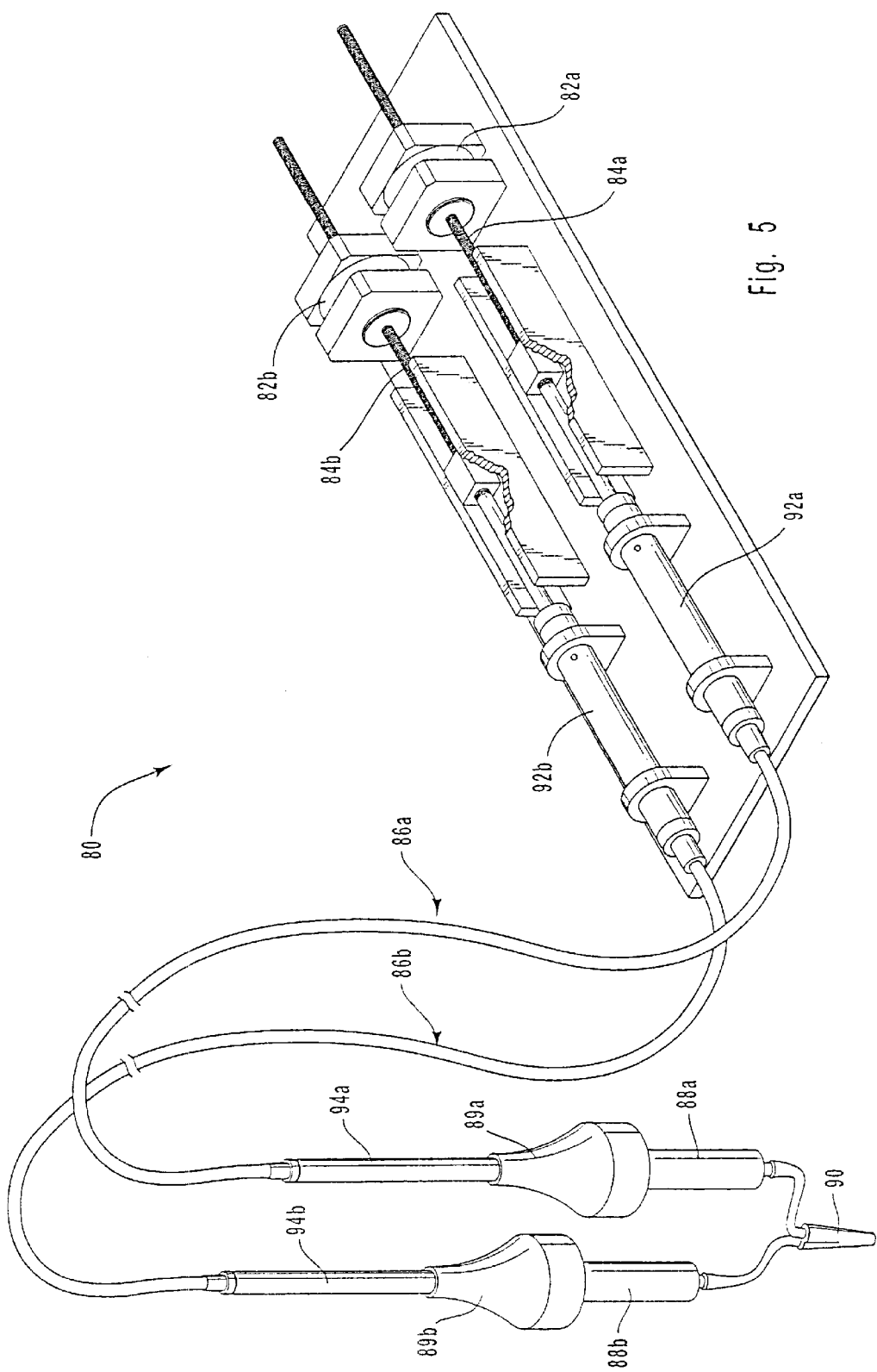
FIG. 5 illustrates a representative system that may be used in accordance with the present invention to mix and/or dispense a multipart target fluid therefrom, or to dispense a plurality of volumetric amounts of one or more target fluids.

For example, and with reference to FIG. 5, an alternative embodiment of the present invention is illustrated as system 80, which includes multiple actuators 82, hydraulic couplers 86, and containers 88. The combination of hydraulic couplers 86 is an example of hydraulic means. Furthermore, while two actuators, hydraulic couplers, and containers are illustrated, embodiments of the present invention embrace more than two or any combination of any number of actuators, hydraulic couplers, and containers. Furthermore, the number of actuators, hydraulic couplers and containers are not required to dispense directly proportional amounts of target fluid(s). Still further, another example one embodiment of the present invention includes a single actuator and multiple hydraulic couplers and containers.

In FIG. 5, a first target fluid is contained within container 88a and a second target fluid is contained within container 88b. This embodiment is useful for such applications as dispensing a two-part target fluid, such as a two-part epoxy. In the illustrated embodiment, a chamber 90, which may include a vortex (not shown), is coupled to containers 88. As target fluids are dispensed from containers 88, the target fluids are mixed in chamber 90 and dispensed therefrom. The use of multiple actuators enables the ration of each target fluid of the resultant combination of target fluids to be controlled. Therefore, in accordance with the present invention a multi-part target fluid is volumetrically dispensed that may include a direct ratio (e.g., 1:1) of target fluids or an indirect ration (e.g., 1:2, 1:10, 1:100) of target fluids. In another embodiment, chamber 90 may direct different target fluid to be dispensed without mixing but in a spaced or relative position to each other. While FIG. 5 illustrates the ability to dispense two target fluids, any plurality of target fluids may be so dispensed.

Utilizing a Computer Device

As provided above, one or more controllers may be used to control one or more actuators. One example of a controller is a computer device. As such, the following provides a discussion relating to a computer device that may be selectively used in accordance with the present invention.

Embodiments of the present invention embrace the use of one or more computer readable media to hydraulically and volumetrically fill a container with target fluid and/or dispense target from a container, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Figure 6:
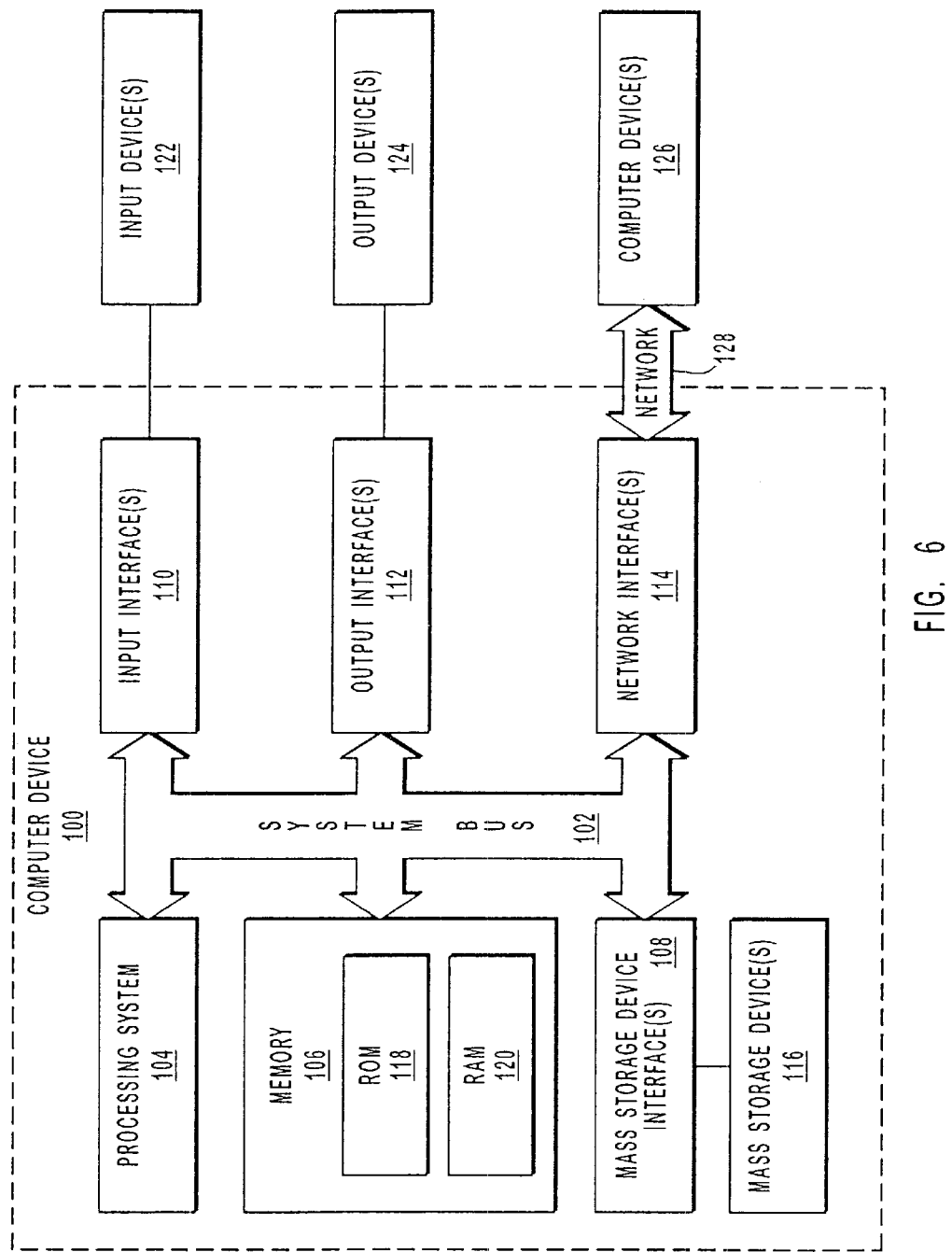
FIG. 6 provides a representative controller system that may be used in association with the present invention to fill or dispense a precise volumetric amount of target fluid.

With reference to FIG. 6, a representative system for use in accordance with the present invention includes computer device 100, which may be a general-purpose or special-purpose computer. For example, computer device 100 may be a personal computer, a notebook computer, a personal digital assistant ("PDA") or other hand-held device, a workstation, a minicomputer, a mainframe, a supercomputer, a multi-processor system, a network computer, a programmable logic controller, a processor-based consumer electronic device, or the like.

Computer device 100 includes system bus 102, which may be configured to connect various components thereof and enables data to be exchanged between two or more components. System bus 102 may include one of a variety of bus structures including a memory bus or memory controller, a peripheral bus, or a local bus that uses any of a variety of bus architectures. Typical components connected by system bus 102 include processing system 104 and memory 106. Other components may include one or more mass storage device interfaces 108, input interfaces 110, output interfaces 112, and/or network interfaces 114, each of which will be discussed below.

Processing system 104 includes one or more processors, such as a central processor and optionally one or more other processors designed to perform a particular function or task.

It is typically processing system 104 that executes the instructions provided on computer readable media, such as on memory 106, a magnetic hard disk, a removable magnetic disk, a magnetic cassette, an optical disk, or from a communication connection, which may also be viewed as a computer readable medium.

Memory 106 includes one or more computer readable media that may be configured to include or includes thereon data or instructions for manipulating data, and may be accessed by processing system 104 through system bus 102. Memory 106 may include, for example, ROM 118, used to permanently store information, and/or RAM 120, used to temporarily store information. ROM 118 may include a basic input/output system ("BIOS") having one or more routines that are used to establish communication, such as during start-up of computer device 100. RAM 120 may include one or more program modules, such as one or more operating systems, application programs, and/or program data.

One or more mass storage device interfaces 108 may be used to connect one or more mass storage devices 116 to system bus 102. The mass storage devices 116 may be incorporated into or may be peripheral to computer device 100 and allow computer device 100 to retain large amounts of data. Optionally, one or more of the mass storage devices 116 may be removable from computer device 100. Examples of mass storage devices include hard disk drives, magnetic disk drives, tape drives and optical disk drives. A mass storage device 116 may read from and/or write to a magnetic hard disk, a removable magnetic disk, a magnetic cassette, an optical disk, or another computer readable medium. Mass storage devices 116 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 110 may be employed to enable a user to enter data and/or instructions to computer device 100 through one or more corresponding input devices 122. The input allows, for example, control of the amount and/or type of target fluid that is being filled and/or dispensed in accordance with the present invention. Examples of such input devices include a keyboard and alternate input devices, such as a mouse, trackball, light pen, stylus, or other pointing device, a microphone, a joystick, a game pad, a satellite dish, a scanner, and the like. Similarly, examples of input interfaces 110 that may be used to connect the input devices 122 to the system bus 102 include a serial port, a parallel port, a game port, a universal serial bus ("USB"), a firewire (IEEE 1394), or another interface.

One or more output interfaces 112 may be employed to connect one or more corresponding output devices 124 to system bus 102. Examples of output devices include a monitor or display screen, a speaker, a printer, and the like. A particular output device 124 may be integrated with or peripheral to computer device 100. Examples of output interfaces include a video adapter, an audio adapter, a parallel port, and the like.

One or more network interfaces 114 enable computer device 100 to exchange information with one or more other local or remote computer devices, illustrated as computer devices 126, via a network 128 that may include hardwired and/or wireless links. The data exchange enables, for example, feedback of information to another system. Examples of network interfaces include a network adapter for connection to a local area network ("LAN") or a modem, wireless link, or other adapter for connection to a wide area network ("WAN"), such as the Internet. The network interface 114 may be incorporated with or peripheral to computer device 100. In a networked system, accessible program modules or portions thereof may be stored in a remote memory storage device. Furthermore, in a networked system computer device 100 may participate in a distributed computing environment, where functions or tasks are performed by a plurality of networked computer devices. Those skilled in the art will appreciate that the invention may be practiced in networked computing environments with many types of computer system configurations that are used in association with a hydraulic, volumetric target fluid dispenser for accurately dispensing target fluid in accordance with the present invention.

Providing a Mechanical Back-Link

As provided above, embodiments of the present invention embrace filling a container with target fluid and/or dispensing target fluid from the container. In one embodiment, the container includes a slidable or movable wall or cap to fill, contain, or dispense target fluid. A vacuum is selectively created between the slidable cap of the container and a plunger that extends into the container to move the slidable cap. The plunger is selectively used in accordance with the present invention to provide a force on the cap to fill or dispense target fluid. When the plunger is selectively retracted, the vacuum created between the plunger and the cap retracts the cap with the retracting plunger, as will be further explained below.

Figure 7:
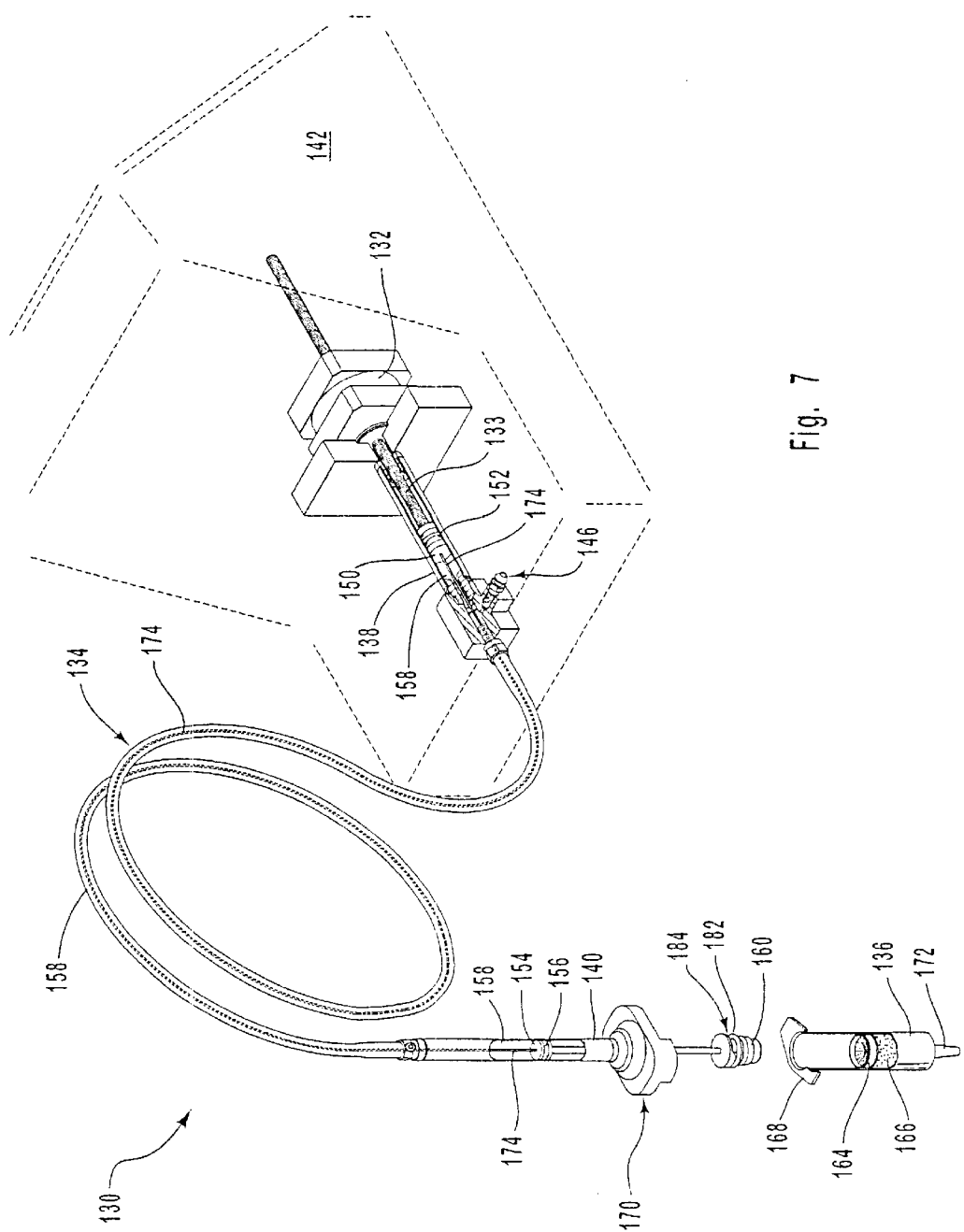
FIG. 7 illustrates a cross-sectional view of a representative system that includes a cord as part of a back-link system.

With reference to FIG. 7, a representative system is illustrated as dispensing system 130 that may be used to selectively fill and/or dispense target fluid. System 130 includes an actuator 132, a hydraulic coupler 134, and a container of target fluid 136 to be dispensed. Actuator 132 is a driving mechanism, which is an example of actuator means. As provided above, actuator 132 creates a linear force on screw 133 that is transferred to hydraulic coupler 134. Coupler 134 is another example of hydraulic means. Hydraulic coupler 134 comprises a master cylinder 138, a conduit 158, a slave cylinder 140, and optionally a cord 174.

Hydraulic coupler 134 is configured to contain a substantially incompressible hydraulic liquid 158, such as silicone, water, silicone oil, alcohol, brake fluid, food grade hydraulic liquid, or another hydraulic liquid that has properties preventing expansion or contraction over a broad enough temperature range. Hydraulic liquid 158 extends from a first hydraulic piston head 150, at least a portion of which is contained within master cylinder 138, through a conduit and to a second hydraulic piston head 154, at least a portion of which is contained within slave cylinder 140. This allows a force by piston head 150 to transfer to piston head 154, causing the master-slave relationship. As provided in the illustrated embodiment, a cord 174 may extend through the hydraulic liquid, with opposing ends of cord 174 coupled to piston head 150 and piston head 154. In one embodiment, the cord is a rigid cord and comprises metal, a polymer, or another rigid material. In a further embodiment, the metal is stainless steel. Moreover, in one embodiment, the cord is a chain or cable and the heads of the pistons are crimped onto the cable.

As such, a force retracting piston head 150 correspondingly retracts piston head 154. The use of cord 174 reduces and/or eliminates a delayed response by piston head 154 to changes in the force acting on head 154 and avoids the necessity of relying upon negative hydrator pressure alone to retract head 154. Cord 174 provides a direct, mechanical back link to retract head 154 when head 150 is retracted.

In order to prevent leakage of hydraulic liquid 158, one or more seals may be placed at or near the respective heads of piston heads 150 and 154. In FIG. 7, the seals are respectively illustrated as O-rings 152 and 156. While an O-ring is illustrated in the present embodiment, those skilled in the art will appreciate that other seals may be used, such as one or more quad seals, or one or more flaps.

Thus, in the illustrated embodiment, actuator 132 initiates a force that displaces piston head 150 in either a forward or backward direction. The displacement of a piston, such as piston head 150, is an example of actuating the hydraulic means. The displacement force is hydraulically and/or mechanically transferred to one or more other pistons to selectively. dispense a target fluid or fill a container with target fluid. In the illustrated embodiment, the force is hydraulically transferred as piston head 150 is displaced in a forward direction, causing the force to be transferred through the incompressible hydraulic liquid 158 and onto piston head 154, causing plunger 160 to extend down container 136 to dispense target fluid 166 out of tip 172 of container 136. Alternatively, the force is hydraulically and mechanically transferred as piston head 150 is displaced in a backward direction, causing the hydraulic liquid 158 and cord 174 transfer a force onto piston head 154 to retract head 154 toward master cylinder 138, and correspondingly retracts plunger 160 from container 136 to stop dispensing, to selectively fill container 136 with target fluid 166, or allow target fluid 166 to enter into container 136, which may include allowing air to enter into container 136.

While the embodiment illustrated in FIG. 7 illustrates a hydraulic coupler/system that comprises two pistons, embodiments of the present invention embrace hydraulic couplers/systems that comprise more than two pistons. In one embodiment, a bleeder screw 146 is provides to allow for hydraulic liquid 158 to be added or removed from coupler 134.

In FIG. 7, container 136 is configured to contain a target fluid therein and is coupled to hydraulic coupler 134 at connector 170. Container 136 is an example of dispensing means. Furthermore, the term "dispensing means" includes a plurality of dispensing means per hydraulic means. In the illustrated embodiment, container 136 is configured to contain a reservoir of target fluid 166 that may be selectively and accurately filled and/or dispensed from container 136 in accordance with the present invention. In one embodiment, container 136 includes a slidable or movable wall or cap (illustrated as cap 164) to fill, contain, and dispense target fluid 166. Other embodiments embrace the use of a slidable or movable plunger to contain and dispense the target fluid.

Container 136 may be removably or fixably coupled to hydraulic coupler 134. In the illustrated embodiment, container 136 includes a surface 168 that may be selectively and rotatably coupled to a receiver of connector 170. When coupled, a distal end, illusrated as plunger 160, of piston head 154 extends down at least a portion of container 136. Thus, as provided above, when a forward force is transferred to piston head 154, plunger 160 moves toward tip 172 of container 136 to cause an amount of the target fluid 166 to be dispensed therefrom. In a further embodiment, container 136 comprises a polymer and/or is disposable. Alternatively, when a backward force is transferred to piston head 154, plunger 160 withdrawals, retracts, or moves away from tip 172, as will be further described below.

A controller 142 may optionally be coupled to actuator 132 to cause actuator 132 to create a precise force on hydraulic coupler 134. As provided above, one example of a controller is a computer device that may be selectively programmed to control actuator 132.

With reference now to FIGS. 8A and 8B, a representative example is provided of a dynamic plunger having two functions. First it allows for the removal of trapped air between cap 164 and plunger 160, second it ensures the creation of a vacuum when plunger 160 moves toward coupler 134 to withdraw or retract a slidable surface or cap 164 therewith. In FIG. 8A, position 180 illustrates a downwardly extending dynamic plunger, illustrated as plunger 160, within container 136. The present invention contemplates plungers and caps that do not have a fixed interface or connection, but only a passive one. Container 136 includes a slidable surface or cap, illustrated as cap 164 that contains target fluid 166 within container 136. As plunger 160 is placed into and extends down container 136, air may initially be trapped within cavity 186 between plunger 160 and cap 164. The trapped air provides an uncontrollable, compressible field that reduces the responsiveness of the system to accurately dispense target fluid 166. To avoid this problem, dynamic plunger 160 of the present invention includes a system that allows for the escape of the trapped air. In the illustrated embodiment, the system that allows for the trapped air to escape includes sliding ring 182 and aperture or passageway 184. The inner diameter of ring 182 allows for ring 182 to selectively slide about plunger 160 in recess 161. In a further embodiment, sliding ring 182 is facilitated by having an outside diameter that brings ring 182 into contact with the inner wall 135 of container 136. Thus, as plunger 160 is in an extending position for placement into container 136 for dispensing, ring 182 is positioned away from target fluid 166, thereby allowing air trapped in cavity 186 to escape around plunger 160 and through passageway 184, as indicated by arrow 188.

With reference now to FIG. 8B, the dynamic plunger, illustrated as plunger 160, is illustrated in a withdrawal or retracting position 190. When plunger 160 is withdrawn from container 136, plunger 160 slides through ring 18 until ring 182 sets against face 163 of recess 161 causing a seal on face 163 and on inner wall 135 of container 136. Because air can no longer pass around plunger 160, a seal is created thereby creating vacuum 192 between plunger 160 and cap 164 when plunger 162 is retracted. Vacuum 192 enables cap 164 to be withdrawn along with plunger 160. As such, container 136 may be selectively filled with target fluid 166. As such, and as illustrated in FIGS. 8A and 8B, a dynamic plunger may be used in accordance with the present invention to selectively vent trapped air or create a vacuum to correspondingly dispense or fill target fluid.

Thus, as discussed herein, the embodiments of the present invention embrace a variety of systems and methods for hydraulically and volumetrically filling and/or dispensing fluid. More particularly, the present invention relates to systems and methods for filling and/or dispensing a known volume of target fluid, whether in a liquid and/or gaseous state, through the use of a hydraulic system. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A target fluid system comprising:
   a hydraulic coupler that includes a cord and a hydraulic liquid, wherein the hydraulic liquid extends between a first piston and a second piston of the coupler, and wherein the cord extends through the hydraulic liquid with a first cord end coupled to the first piston and a second cord end coupled to the second piston;
   a driving mechanism configured to create a force to selectively actuate the first piston, wherein the driving mechanism is coupled to the hydraulic coupler; and
   a container configured to contain a target fluid separate from the hydraulic liquid, wherein the container includes a slidable wall, and wherein the container is coupled to the hydraulic coupler.

2. A target fluid system as recited in claim 1, wherein the cord is rigid.

3. A target fluid system as recited in claim 2, wherein the cord comprises one of:
   (i) metal; and
   (ii) a polymer.

4. A target fluid system as recited in claim 1, wherein the second piston is coupled to a dynamic plunger that is configured to selectively extend down the container.

5. A target fluid system as recited in claim 4, wherein the dynamic plunger includes a dual vented-vacuum mechanism that corresponds to the slidable wall and is configured to selectively: (i) allow air between the dynamic plunger and the slidable wall to vent when the dynamic plunger is in an extended position; and (ii) seal the space between the plunger and the slidable wall to create a vacuum between the dynamic plunger and the slidable wall when the dynamic plunger is in a retracted position.

6. A target fluid system as recited in claim 5, wherein the vacuum enables the slidable wall to retract with the dynamic plunger.

7. A target fluid system as recited in claim 6, wherein the venting of the air enables a portion of the dynamic plunger to directly contact the slidable wall.

8. A target fluid system as recited in claim 5, wherein the dynamic plunger comprises:
   a recess about the dynamic plunger and a ring located in the recess, wherein the ring includes an inside diameter to allow movement of the plunger to place the ring at one of (i) a venting position and (ii) a sealing position within the recess, and wherein the ring includes an outside diameter that corresponds to an inside diameter of the container to slidably and sealably couple the ring with an inside wall of the container;
   an aperture located in the plunger and configured to allow air to vent when the ring is in the venting position; and
   a face on the recess of the plunger against which the ring seals in the sealing position to prevent air from passing around the plunger, thereby creating a sealed space between the plunger and the slidable wall.

9. A target fluid system as recited in claim 1, further comprising a controller coupled to the driving mechanism.

10. A target fluid system as recited in claim 9, wherein the controller is a computer device.

11. A target fluid system as recited in claim 1, wherein the driving mechanism comprises at least one of:
    (i) a step motor;
    (ii) a linear actuator;
    (iii) a servomotor; and
    (iv) a pneumatic motor.

12. A target fluid system as recited in claim 1, wherein the hydraulic liquid comprises at least one of:
    (i) silicone;
    (ii) alcohol;
    (iii) oil; and
    (iv) water.

13. A target fluid dispenser as recited in claim 1, wherein the target fluid comprises one of:
    (i) a lubricant;
    (ii) a sealant;
    (iii) an adhesive;
    (iv) a paint;
    (v) a medication;
    (vi) a solvent;
    (vii) a powder;
    (viii) a food product;
    (ix) a paste;
    (x) a cyanoacrylate;
    (xi) a lotion; and
    (xii) a gas.

14. In a target fluid system that includes a dynamic plunger, a method for providing a dual vented-vacuum drawback, the method comprising the steps for:
    providing a hydraulic coupler that includes a cord and a hydraulic liquid, wherein the hydraulic liquid extends between a first piston and a second piston of the coupler, and wherein the cord extends through the hydraulic liquid with a first cord end coupled to the first piston and a second cord end coupled to the second piston;
    providing the dynamic plunger that is configured to selectively extend down a container configured to contain a target fluid separate from the hydraulic liquid, wherein the container includes a slidable wall;
    initiating a force at the first piston, wherein the force selectively moves the dynamic plunger in one of (i) an extending direction; and (ii) a retracting direction;
    if the force moves the dynamic plunger in the extending direction, allowing air between the dynamic plunger and the slidable wall to be vented; and
    if the force moves the dynamic plunger in the retracting direction, creating a vacuum seal between the dynamic plunger and the slidable wall.

15. A method as recited in claim 14, wherein the step for allowing comprises the steps for:
    providing a recess about the dynamic plunger and a ring located in the recess, wherein the ring includes an inside diameter to allow movement of the dynamic plunger in the extending direction to place the ring at a venting position; and
    using an aperture located in the dynamic plunger to allow air to vent when the ring is in the venting position.

16. A method as recited in claim 14, wherein the step for creating a vacuum comprises the steps for:
    providing a recess about the dynamic plunger and a ring located in the recess, wherein the ring includes an inside diameter to allow movement of the plunger in the retracting direction to place the ring in a sealing position within the recess, wherein the ring includes an outside diameter that corresponds to an inside diameter of the container to slidably and sealably couple the ring with an inside wall of the container; and providing a face on the recess of the plunger against which the ring seals in the sealing position to prevent air from passing around the plunger, thereby creating a sealed space between the plunger and the slidable wall.

17. A method for providing a vented-vacuum drawback in a target fluid system, the method comprising the steps for:

providing a hydraulic coupler that includes a cord and a hydraulic liquid, wherein the hydraulic liquid extends between a first piston and a second piston of the coupler, and wherein the cord extends through the hydraulic liquid with a first cord end coupled to the first piston and a second cord end coupled to the second piston;

providing a dynamic plunger that is configured to selectively extend down a container of target fluid, wherein the container includes a slidable wall;

determining whether to move the dynamic plunger in a first direction, wherein if the dynamic plunger is moved in the first direction, performing the step for allowing air between the dynamic plunger and the slidable wall to be vented; and determining whether to move the dynamic plunger in a second direction, wherein if the dynamic plunger is moved in the second direction, performing the step for creating a vacuum seal between the dynamic plunger and the slidable wall.

18. A method as recited in claim 17, wherein the step for allowing comprises the steps for:

providing a recess about the dynamic plunger and a ring located in the recess, wherein the ring includes an inside diameter to al low movement of the dynamic plunger in the extending direction to place the ring at a venting position; and using an aperture located in the dynamic plunger to allow air to vent when the ring is in the venting position.

19. A method as recited in claim 17, wherein the step for creating a vacuum comprises the steps for:

providing a recess about the dynamic plunger and a ring located in the recess, wherein the ring includes an inside diameter to allow movement of the plunger in the retracting direction to place the ring in a sealing position within the recess, wherein the ring includes an outside diameter that corresponds to an inside diameter of the container to slidably and sealably couple the ring with an inside wall of the container, and providing a face on the recess of the plunger against which the ring seals in the sealing position to prevent air from passing around the plunger, thereby creating a sealed space between the plunger and the slidable wall.

20. A computer program product for implementing within a target fluid system a method for providing a vented vacuum withdrawal, the computer program product comprising:

a computer readable medium for providing computer program code means utilized to implement the method, wherein the computer program code means comprises executable code for implementing the step for;

initiating a force at a first piston of a hydraulic coupler that includes a cord and a hydraulic liquid, wherein the hydraulic liquid extends between the first piston and a second piston of the coupler, and wherein the cord extends through the hydraulic liquid with a first cord end coupled to the first piston and a second cord end coupled to the second piston, wherein the force selectively moves a dynamic plunger, which is configured to selectively extend down a container of target fluid having a slidable wall, in one of:

(i) an extending direction, which allows air between the dynamic plunger and a slidable wall of a target fluid container to be vented; and (ii) a retracting direction, which enables a vacuum seal to be formed between the dynamic plunger and the slidable wall.

* * * * *